June 25, 1957 W. B. LOCKE, SR., ET AL 2,796,776
INDEXING TABLE
Filed June 4, 1952 4 Sheets-Sheet 2

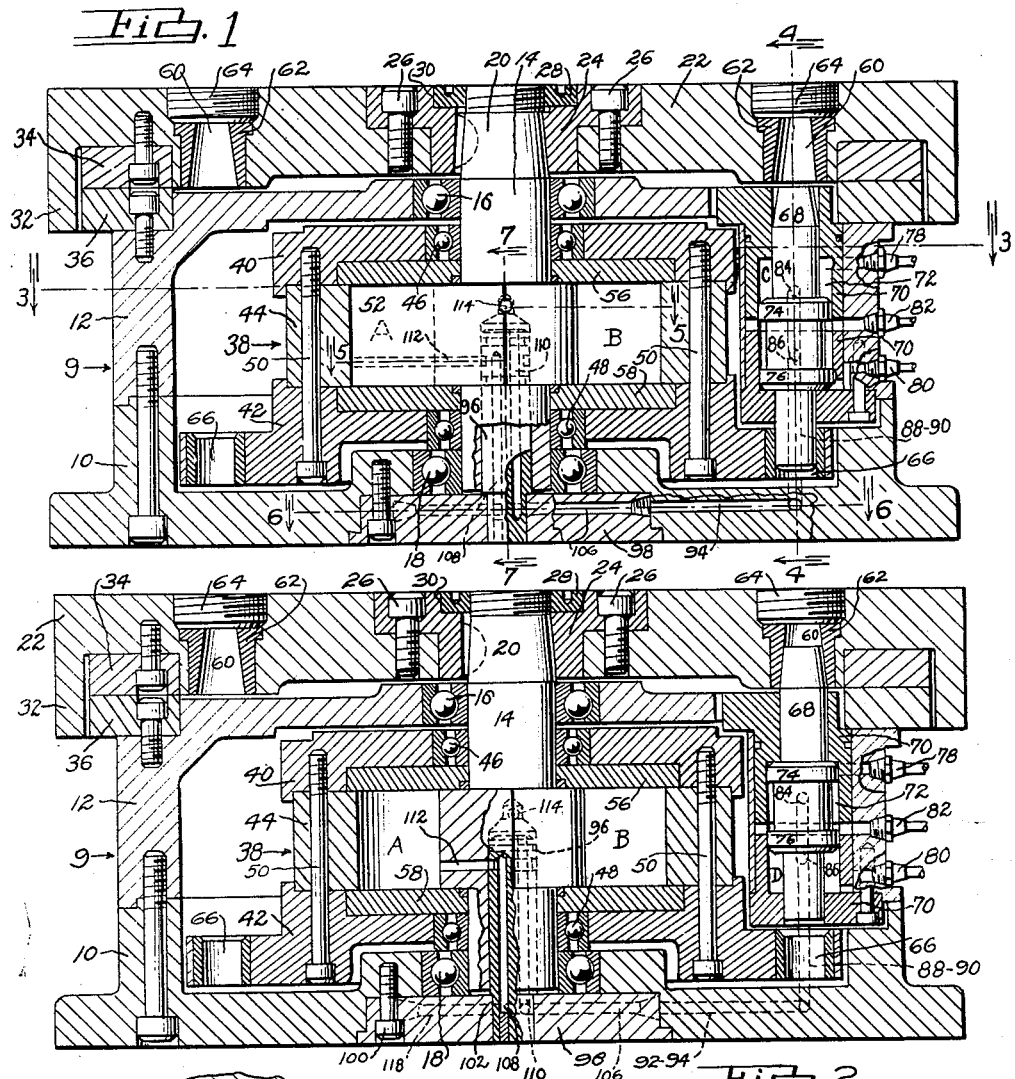

INVENTORS
WILLIAM B. LOCKE SR. AND
KENMORE M. EVERLY
BY
THEIR ATTORNEY

June 25, 1957  W. B. LOCKE, SR., ET AL  2,796,776
INDEXING TABLE
Filed June 4, 1952  4 Sheets-Sheet 3

INVENTORS
WILLIAM B. LOCKE SR. AND
KENMORE M. EVERLY
BY
THEIR ATTORNEY

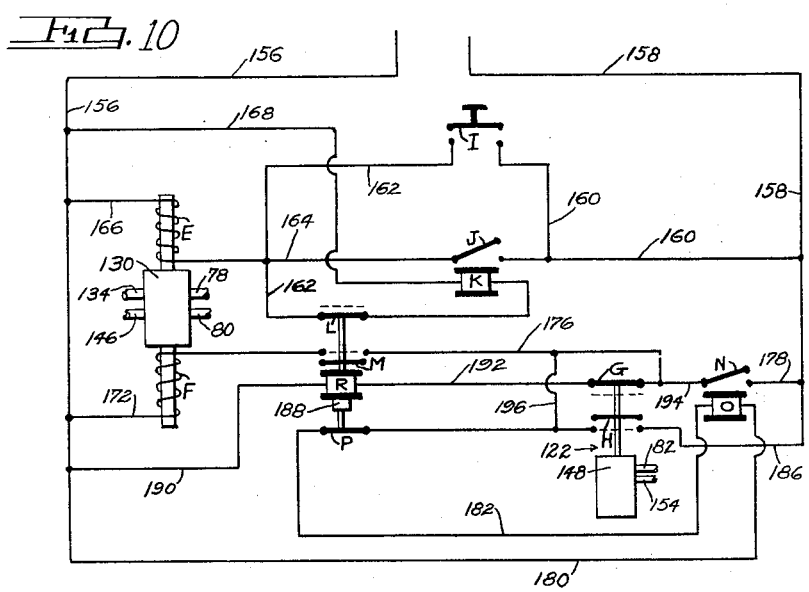
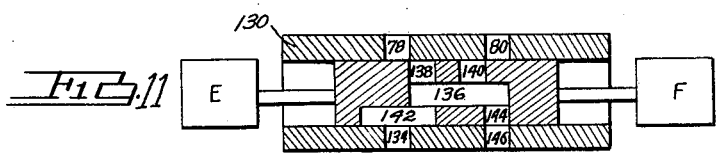
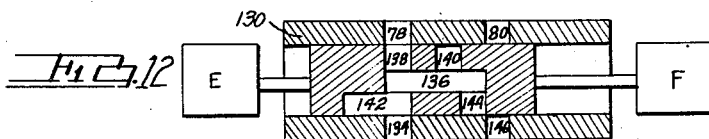
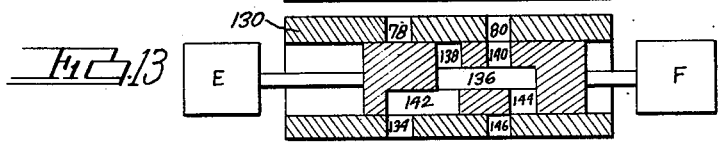
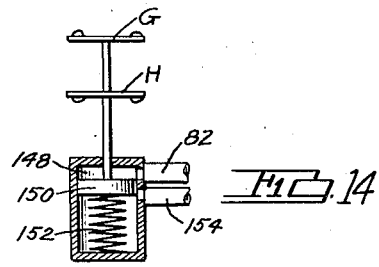

United States Patent Office 2,796,776
Patented June 25, 1957

2,796,776

INDEXING TABLE

William B. Locke, Sr., Highland Park, and Kenmore M. Everly, Detroit, Mich.; said Everly assignor to said Locke, Sr.

Application June 4, 1952, Serial No. 291,694

2 Claims. (Cl. 74—822)

This invention relates to an indexing table of the type adapted for intermittent advancement from one station to another and one in which the table is locked in one of a plurality of predetermined positions.

It is an object of the invention to provide a rotatable plate which is supported on a stationary housing; to intermittently rotate the plate through an arc of predetermined degrees by a rotatable spindle having relative angular movement in a rotatable casing within the housing; and to use a fluid pressure for producing relative angular movement between the spindle and the casing. More specifically stated the invention consists in providing means for causing the fluid pressure to rotate the spindle relative to the casing, the casing forming a stop for limiting the angular movement of the spindle, and to rotate the casing relative to the spindle with the spindle forming a stop for limiting the angular movement of the casing.

Another object of the invention is to provide a locking means for the rotatable plate and the rotatable casing, which are alternately locked against rotation, by moving the locking means by the fluid pressure used for producing relative rotation of the spindle and the casing.

A further object of the invention is to provide an adjustable means for predetermining the directional flow of the fluid pressure, whereby the rotatable parts may be moved in predetermined directions of rotation.

A further object of the invention is to provide adjustable means for predetermining the relative angular movement of the spindle and the casing.

A still further object of the invention is to provide a closed system wherein the moving parts of the device are sealed against leakage and the entrance of foreign matter to the system.

Other objects and advantages of the invention will be more fully understood from the following description taken in connection with the accompanying drawings in which;

Fig. 1 is a transverse sectional view of my improved indexing table, showing the rotatable casing locked to the stationary housing with the plate free for rotation relative to the housing;

Fig. 2 is a view corresponding to Fig. 1 but showing the plate locked to the housing and the casing free for rotation relative to the housing;

Fig. 5 is a fragmentary cross sectional view taken on line 5—5 of Fig. 1;

Fig. 10 is a wiring diagram of the electrical controls for operating the fluid control system and the timing mechanism;

Fig. 11 is a cross sectional view of the fluid pressure valve in its neutral and normal position;

Fig. 12 is a view corresponding to Fig. 11, showing the valve in a position for supplying a fluid pressure through one of the fluid lines; and Fig. 13 is a view corresponding to Fig. 11, showing the valve in a position for supplying a fluid pressure through another of the fluid lines; and Fig. 14 is a cross sectional view through the fluid pressure control.

Figure 3:
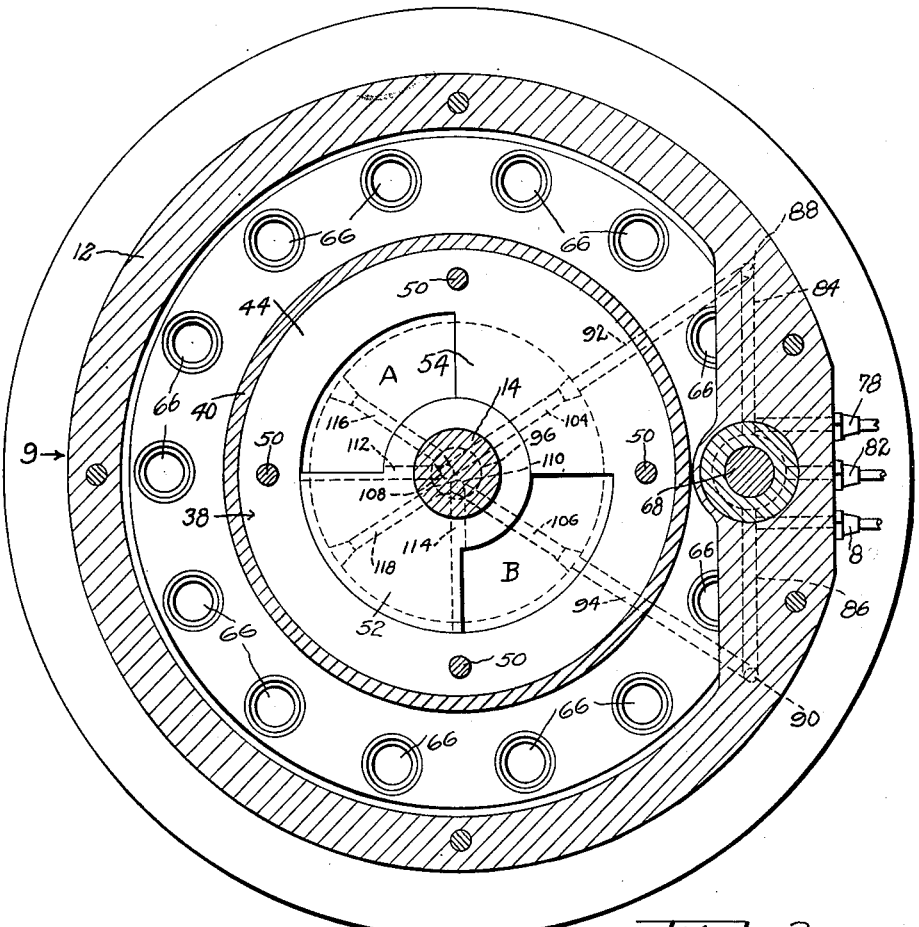
Fig. 3 is a cross sectional view taken on line 3—3 of Fig. 1.

Referring to the drawings, there is shown a housing 9 having a lower base portion 10 and an upper head portion 12. The two portions 10 and 12 form a hollow chamber, the opposite ends thereof supporting a vertical spindle 14 in bearings 16 and 18. The upper outer end of the spindle 14 is tapered at 20 and receives a plate 22. The plate 22 is provided with a central sleeved bushing 24 which is secured to the plate 22 by screws 26 and is keyed to the spindle 14 so that the plate 22 is rotatable with the spindle 14. A nut 28 is screw threaded to the end of the spindle 14 and is received in a counter bore 30 in the bushing 24. The plate 22 has an overhanging flange 32 at its outer periphery which extends below the upper surface of the housing portion 12. A wear ring 34 is detachably secured to the under surface of the plate 22 and a wear ring 36 is detachably secured to the upper surface of the housing head portion 12. The ring 34 rests on the ring 36 and forms a sealed support for the plate 22.

Rotatably mounted on the spindle 14 and within the hollow housing 9 is a casing 38. This casing 38 has an upper plate 40, lower plate 42 and an intermediate ring 44. The plate 40 and 42 are provided with bearings 46 and 48 respectively for rotation on the spindle 14. The plates 40 and 42 and the ring 44 are secured together by screws 50. The ring 44, between the plates 40 and 42 forms a fluid chamber which is divided into chambers A and B by a fan part 52 on the spindle 14 and an inwardly projecting segment 54 in the inner periphery of the ring 44.

Wear plates 56 and 58 are provided on the inner surfaces of the plates 40 and 42. These plates accurately fit the outer surfaces of the ring 44 and the opposite outer surfaces of the fan part 52, the latter surfaces being machined with the outer side surfaces of the ring 44 to compensate for any wear.

The fan 52 on the spindle 14 and the segment 54 on the ring 44 of the casing 38 form a lost motion driving connection between the spindle 14 and the casing 38.

Referring more particularly to Fig. 3 it will be seen that the spindle 14 may be rotated relative to the ring 44 through an arc of 90 degrees in either clockwise or counter-clockwise direction. Fluid pressure in the chamber A between the fan 52 and the stop segments 54, will produce a rotation of the spindle 14 and plate 22 in a counter-clockwise direction or will produce rotation of the ring 44 and casing 38 in a clockwise direction. By applying a fluid pressure to the chamber B, the direction of rotation of the parts is reversed.

The plate 22 is provided with a plurality of apertures 60, having bushings 62 with tapered openings and plugs 64 closing the outer ends of the apertures to provide a smooth surface on the outer surface of the plate 22. These apertures 60 are circumferentially spaced at any predetermined distance apart and may be of any number within the limits of lock pin spacing, hereinafter more fully described. The lower plate 42 of the chamber 38 is provided with an equal number of apertures 66 in axial alignment with the apertures 60.

Figure 4:
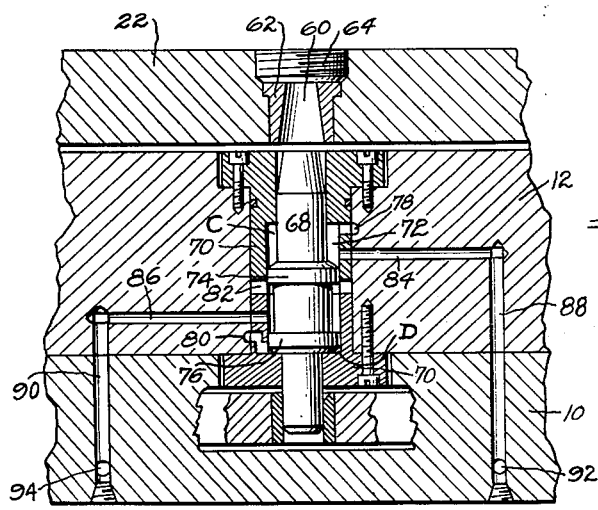
Fig. 4 is a fragmentary cross sectional view taken on line 4—4 of Fig. 1.
Figure 6:
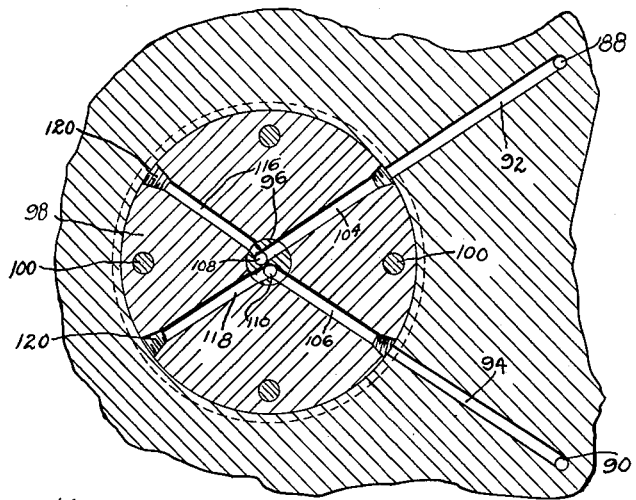
Fig. 6 is a fragmentary cross sectional view taken on line 6—6 of Fig. 1.
Figure 7:
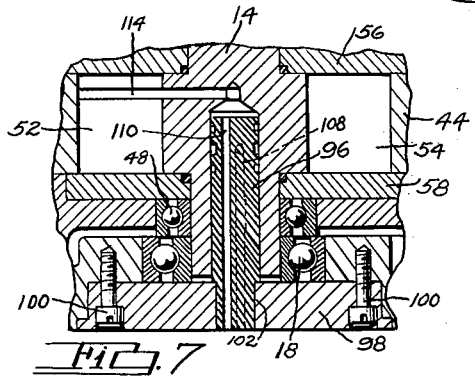
Fig. 7 is a fragmentary cross sectional view taken on line 7—7 of Fig. 1.
Figure 8:
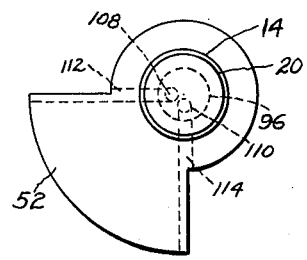
Fig. 8 is a top plan view of the spindle showing the fan.

A reciprocating lock pin 68 is axially movable in bushings 70 fixed to the upper head portion 12 of the housing 9. The bushings 70 are provided with a cylinder portion 72, more clearly shown in Fig. 4, and the lock pin 68 is provided with spaced pistons 74 and 76 which fit the cylinder 72 and form upper and lower chambers C and D. In Figs. 1 and 4 the lock pin 68 is shown in its position when fluid pressure is applied to the chamber C and Fig. 2 shows the lock pin 68 in its position when fluid pressure is applied to the chamber D. Figs. 1 and 4 also show the lock pin 68 in its lowered position with the lower end of the pin received in one of the apertures 66 in the casing 38 whereby the casing 38 is locked against rotation relative to the housing 9. The upper end of the pin 68 is disengaged from the apertures 60 so that the plate 22 is free for rotation with the housing by rotation of the spindle 14. Fig. 2 shows the lock pin 68 in its raised position with the upper end of the pin received in one of the apertures 60 and the lower end of the lock pin 68 is disengaged from the apertures 66 so that the plate 22 is locked against rotation with respect to the housing 9 and the casing 38 is free for relative rotation with respect to the housing 9. Thus it will be understood that when the lock pin 68 is in the position shown in Fig. 1, any fluid pressure in chamber A will cause the plate 22, spindle 14 and fan 52 to rotate in a counter-clockwise direction until the approaching surface of the fan 52 strikes the stop segment 54, the latter being held against rotation by the lower end of the pin 68 which is in one of the apertures 66, locking the casing 38 against rotation with the housing. When the pin 68 is in its position shown in Fig. 2, fluid pressure in the chamber B will cause rotation of the segment 54, and casing 38 in a counter-clockwise direction relative to the housing and plate 22 until the approaching surface of the segment 54 strikes the stationary fan 52, the latter being held against rotation relative to the housing 9 by the upper end of the pin in one of the apertures 60 of plate 22.

To more clearly understand the fluid pressure flow for operation of the parts, it must be understood that there are three divisions of fluid passages. One will be designated as a pressure system, another a drain system and the third, the exhaust system. The pressure system and the drain system operate alternately; that is, the passages for the pressure application become the pressure passages during alternate cycles of operation.

The fluid pressure inlet passages are shown at 78 and 80 and the exhaust outlet passage is shown at 82. The passages 78 and 80 extend radially through the head portion 12 of the housing 9 and through the bushings 70 into communication with the opposite ends of the chambers C and D. Two ports 84 and 86, better shown in Fig. 4, communicate with the cylindrical portions 72 of the bushings 70, extend transversely in the head 12 and then downwardly through passages 88 and 90 in the base portion 10 of the housing 9. These passages continue radially as passages 92 and 94 toward the center of the device into a header block 96.

The header block 96 comprises a plate 98 which is removably supported in the base 10 by screws 100 and a distributor spindle 102 pressed into the plate 98 and received in the lower end of the spindle 14. The plate 98 is provided with one pair of radially extending passages 104 and 106 which, when the plate is in the position shown, communicate with the passages 92 and 94 respectively. A pair of vertical passages 108 and 110 connect with the passages 104 and 106 respectively, the one passage 108 terminating in a radially extending passage 112 through the spindle 14 to the chamber A and the passage 110 terminating in a radially extending passage 114 through the spindle 14 to the chamber B. The plate 98 is further provided with another pair of passages 116 and 118 having one end of each communicating respectively with the passages 108 and 110 in reverse order to that of passages 104 and 106. The opposite ends of the passages 116 and 118 are normally closed by removable plugs 120.

As shown in the drawings, the parts are arranged to index the plate 22 in one direction of rotation, but if it is desired to reverse the direction of rotation, the screws 100 are removed, the plugs 120 are removed from the passages 116 and 118, placed in the outer ends of passages 104 and 106. The plate 98 is then turned through an angle of 180 degrees so that the passages 116 and 118 align with the passages 110 and 108. The fluid pressures are then directed into chambers A and B in reverse order causing rotation of the casing 38 and plate 22 in a clockwise direction.

To index the plate 22, a fluid pressure is applied through passage 78 to chamber C. This forces the lock pin 68 into locking engagement with the casing 38 so that the casing is held stationary with the housing 9 and the plate 22 is free for rotation. The piston 74, as it moves downwardly, uncovers the passage 84 and the fluid pressure then flows through passages 88, 92, 108 and 112 to chamber A. Since the segment 54 is held against rotation by the pin 68, the fluid pressure in chamber A moves the fan 52 in a counter-clockwise direction until the side wall of the fan 52 in chamber B strikes the side wall of the segment 54. During this movement of the fan 52, the fluid in chamber B is drained through passages 114, 110, 94, 90, 86 to the space between the pistons 74 and 76 where it is discharged through the exhaust passage 82.

The fluid pressure in passage 82 is directed to a timer and valve control mechanism 122 which is more clearly disclosed in Figs. 10, 11, 12, 13 and 14 and hereinafter described in detail. This prevents operation of lock pin 68 and reversal of fluid pressures. As soon as the plate 22 has reached its indexed position, the fluid pressure is conducted through passage 80 to chamber D. This forces the lock pin 68 into locking engagement with the plate 22, as shown in Fig. 2, unlocking the casing 38. The piston 76, as it moves upwardly, uncovers the passage 86 and the fluid pressure then flows through passages 90, 94, 110, and 114 to chamber B. Since the fan 52 is now held against rotation by the pin 68, the fluid pressure in chamber B moves the segment 54 in a counter-clockwise direction until the side wall of the segment in chamber A strikes the side wall of the fan 52. The fluid in chamber A is drained through passages 112, 108, 92, 88 and 84 into the space between the two pistons 74 and 76 where it is discharged through the exhaust passage 82. The device is now positioned for the next indexing operation and the cycle may be repeated.

Referring now to the timer and valve control mechanism 122, Figs. 10 to 14 inclusive, wherein the valves for controlling the flow of fluid are operated electrically, there is shown diagrammatically a conventional four way valve 130 having a piston valve 132 moved axially by solenoids E and F at the opposite ends of the piston. The piston valve 132 is normally held in a neutral position, Fig. 11, by springs or the like, when the solenoids are not energized. The fluid pressure is supplied through passage 134 from a source of pressure supply, not shown. The piston valve 132 has a central axially extending passage 136 and two radially extending passages 138 and 140 at one side thereof and two radially extending passages 142 and 144 at the opposite side thereof. The passage 142 is elongated so that it communicates with the fluid pressure passage 134 in any one of three positions of the valve 132. An exhaust passage 146 returns the fluid pressure to the source of supply when the fluid pressure is not being used to operate the moving parts of the mechanism. The fluid passages 78 and 80 are connected to the valve body 30. When the piston valve 132 is in the position shown in Fig. 11, the passages 138 and 140 are closed to the passages 78 and 80 and the fluid pressure is conducted through passages 134, 142, 136 and 144 to exhaust passage 146. This permits a circulation of the fluid pressures without operating the moving parts of the mechanism. If it is desired to conduct the fluid pressure to the passage 78 the piston valve 132 is moved to the left, Fig. 12, by energizing the solenoid E. This causes the fluid pressure to be conducted through passages 134, 142, 136 and 138 to the passage 78. In this position the passages 80 and 146 are closed. When the piston 132 is moved to the right of its neutral position, Fig. 13, by energizing the solenoid F, the pressure in passage 134 is conducted through passages 142, 136 and 140 to passage 80. The exhaust passage 146 is closed.

The exhaust passage 146 is not to be confused with the exhaust passage 82. The exhaust passage 146 only bypasses the fluid pressure when the device is not used for moving the parts of the device. The exhaust passage 82 serves to conduct the fluid from either passage 78 or 80 and has no relation to the piston valve 132 shown in Figs. 11, 12 and 13.

The exhaust passage 82 communicates with a pressure actuated device, Fig. 14, for controlling an electrical system and a timing device. This device is diagramatically illustrated as having a cylinder 148 for receiving the exhaust fluid through passage 82. A piston 150 is moved downwardly, against a compression spring 152, by the exhaust fluid pressure. The piston, in its down position, uncovers a discharge passage 154 so that the exhaust fluid is conducted through the cylinder 148 to the fluid supply and the piston is retained in its down position so long as there is any fluid pressure in the cylinder 148. Two switch arms G and H are connected to the piston so that movement of the piston opens and closes the switches G and H.

The parts of the timer control system is described by reference to Fig. 10. The electrical supply line is indicated by the electrical conductor wires 156 and 158. A control push button I, normally open, is connected through lead wire 160 to the conductor wire 158 and to lead wires 162 and 164 to one side of the solenoid E. The other side of the solenoid is connected through lead wire 166 to the conductor wire 156. Shunted across the push button I is a normally open switch J. The switch J is closed by a relay K, connected through lead 168 to conductor 156 and to one side of a normally closed switch L through lead 170. The other side of switch L is connected to lead 162. One side of the solenoid F is connected to the conductor 156 by lead 172 and the other side is connected to one side of a normally open switch M by lead 176 to one side of a normally open switch N and the other side of switch N is connected by lead 178 to the conductor 158. The switch N is closed by a relay O, having one side connected to conductor 156 by lead 180 and the other side connected to one side of a timer switch P through lead 182. The other side of the switch P is connected through lead 184 to one side of the normally open switch H. The other side of switch H is connected through lead 186 to the conductor 158. The timer switch P is opened by an adjustable time delayed actuator 188 controlled by a time relay R having one side connected through lead 190 to conductor 156 and its opposite side connected to one side of the normally closed switch G through lead 192. The other side of the switch G is connected through lead 194 to the lead 176.

The normally closed switch L and the normally open switch M are connected together and are operated simultaneously by the relay R and the timer 188 is actuated in delayed action by the relay R and opens and closes the switch P.

The operation of the device is as follows: the operator closes the push button switch I. This energizes the solenoid E, from 158, through 160, switch I, 162, 164, E, 166 to 156. The closed switch also energizes the relay K; the circuit being through 158, 160, switch I, 162, closed switch L, 170, relay K, 168 to conductor 156. Relay K closes switch J so that the solenoid E remains energized after the push button switch I has been released and open.

When the solenoid E is energized the piston valve 132 moves to the position shown in Fig. 12 and the fluid flows through passages 134, 142, 136 and 138 to passage 78 to chamber A, rotating the spindle 14 and plate 22 in a counter-clockwise direction as above described in the indexing operation. As soon as the spindle 14 starts rotating, a fluid pressure is built up in chamber B and the fluid as before described is discharged through outlet passage 82. This fluid then enters cylinder 148 and the pressure moves the piston 150 downwardly, closing switch H and opening switch G. The closing of the switch H causes a circuit from conductor 158, through 186, switch H, 184, switch P, 182, relay O, 180 and 156 which closes switch N. As soon as the pressure reaches zero by stoppage of rotation of the spindle 14, the piston 150 moves upwardly closing switch G and opening switch H. Closing of the switch G energizes the timer relay R causing opening of the switch L and closing of the switch M. This circuit is through conductor 158, 178, closed switch N, 194, closed switch G, 192, relay R, 190 and 156. The relay O holds the switch N closed by the closed circuit from conductor 158, through 178, switch N, 194, lead 196, 184, closed switch P, 182, relay O, 180 and conductor 156. The timer 188 does not open the switch P until the predetermined time interval has elapsed although the relay R has opened the switch L and closed the switch M. The opening of switch L breaks the circuit through relay K, opens switch J, de-energizes solenoid E, and energizes solenoid F through circuit 158, 178, switch N, 176, switch M, 174, solenoid F, 172 and 156. This moves the piston valve 132 to the position shown in Fig. 13 and the fluid pressure is applied through passage 80 to set the system in condition for the next indexing operation. At the end of the predetermined timing period timer 188 opens switch P. This opens the circuit through relay O and the switch N opens which de-energizes relay R whereupon switch L is closed and switch M is opened thereby de-energizing solenoid F. The piston valve 132 is returned to its neutral position as shown in Fig. 11 and the system has completed one cycle of its operation; that is, indexed to a new station and reset the parts for the next indexing operation by merely a momentary contact of the push button switch I.

Figure 9:
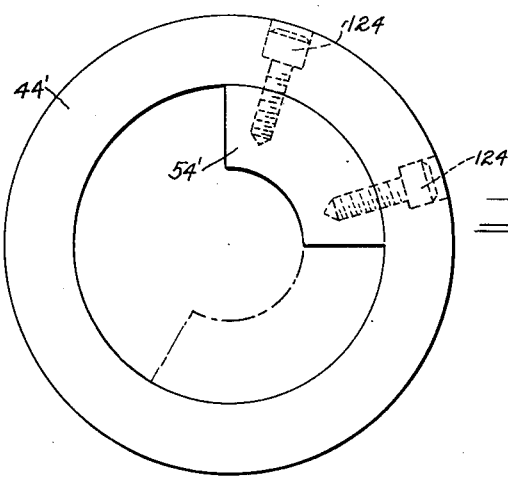
Fig. 9 is a top plan view of a modified form of casing ring showing a replaceable stop segment.

The number of degrees of rotation of the plate 22; that is, the number of stations in a complete revolution of the plate 22, is determined by the arcuate dimension of segment 54. In Figs. 3 and 5 the segment 54 and the fan 52 are shown as 90 degrees each. This will provide a two station indexing table, the plate 22 moving through 180 degrees for each indexing cycle. The fan 52 has its opposite faces spaced apart 90 degrees for any number of stations, but the spacing of the segment 54 faces is varied. The segment 54 may be an integral part of the ring 44. A supply of rings, each having face spacing of different arcuate dimension, may be provided and any one used having the predetermined arcuate dimension to give the selected indexing angle of rotation. As illustrated in Fig. 9, I have shown the segment 54' as detachable from the ring 44' and held thereon by screws 124. These opposite end faces of the replaceable segments may vary in arcuate dimension as indicated by the dot and dash lines, and the selected arcuate dimension will determine the indexing angle.

From the above it will be seen that there has been provided an indexing table which is operated by fluid pressure; the table may be rotated in either clockwise or counter-clockwise direction; the table is positively locked in working position; the number of indexing stations may be varied; and the working parts are sealed to retain the fluid pressure within the system and to prevent the entrance of foreign matter to the system.

While the invention has been illustrated and described in its preferred embodiment, it will be understood that various changes including the size, shape and arrangement of parts may be made without departing from the spirit of the invention and it is not the intention to limit its scope other than by the terms of the appended claims.

We claim:

1. An indexing table comprising, a housing, a spindle rotatably supported in said housing, a plate carried by said spindle having a plurality of circumferentially space openings, a member rotatably supported on said spindle having a radially extended portion provided with a plurality of circumferentially spaced openings in axial alignment with the openings in said plate, a lock pin reciprocable in said housing for entering one of the openings in said plate or one of the openings in said member, and fluid pressure means for moving either said plate or said member relative to the other in one and the same direction of rotation, said lock pin constituting a valve for controlling the fluid pressure means to effect rotation of said plate or said member.

2. An indexing table comprising, a housing, a spindle rotatably supported in said housing, a plate carried by said spindle having a plurality of circumferentially spaced openings, a member rotatably supported on said spindle having a radially extending portion provided with a plurality of circumferentially spaced openings in axial alignment with the openings in said plate, a fluid pressure motor operable between said spindle and said member for effecting alternate rotation of said spindle and said member, and a fluid pressure actuated valve for directing a fluid pressure to said motor, said valve being provided with oppositely disposed pins, one for locking said plate against rotation when said valve is in one position and the other for locking said member against rotation when said valve is in another position.

References Cited in the file of this patent
UNITED STATES PATENTS

| | | |
|---|---|---|
| 728,573 | Hanson | May 10, 1903 |
| 1,528,509 | Rhodes | Mar. 3, 1925 |
| 1,909,767 | Johnson | May 16, 1933 |
| 2,380,873 | Schafer et al. | July 31, 1945 |